United States Patent
Itu et al.

(10) Patent No.: US 11,995,823 B2
(45) Date of Patent: May 28, 2024

(54) TECHNIQUE FOR QUANTIFYING A CARDIAC FUNCTION FROM CMR IMAGES

(71) Applicant: SIEMENS HEALTHINEERS AG, Forchheim (DE)

(72) Inventors: Lucian Mihai Itu, Brasov (RO); Andrei Bogdan Gheorghita, Brasov (RO); Puneet Sharma, Princeton Junction, NJ (US); Teodora Chitiboi, Jersey City, NJ (US)

(73) Assignee: Siemens Healthineers AG, Forchheim (DE)

( * ) Notice: Subject to any disclaimer, the term of this patent is extended or adjusted under 35 U.S.C. 154(b) by 521 days.

(21) Appl. No.: 17/445,204

(22) Filed: Aug. 17, 2021

(65) Prior Publication Data
US 2022/0092771 A1   Mar. 24, 2022

(30) Foreign Application Priority Data

Sep. 18, 2020 (DE) ..................... 10 2020 211 736.5
Sep. 18, 2020 (EP) ..................... 20465559

(51) Int. Cl.
   *G06T 7/00*   (2017.01)
(52) U.S. Cl.
   CPC .. *G06T 7/0012* (2013.01); *G06T 2207/10088* (2013.01); *G06T 2207/30048* (2013.01)
(58) Field of Classification Search
   CPC ......... G06T 7/0012; G06T 2207/10088; G06T 2207/30048
   See application file for complete search history.

(56) References Cited

U.S. PATENT DOCUMENTS

2021/0125037 A1*   4/2021   Oliveira Ferreira .. G06T 7/0012

OTHER PUBLICATIONS

Cikes M et al., Beyond ejection fraction: an integrative approach for assessment of cardiac structure and function in heart failure, Eur Heart J. Jun. 1, 2016;37(21):1642-50.
Bernard O et al., Deep Learning Techniques for Automatic MRI Cardiac Multi-Structures Segmentation and Diagnosis: Is the Problem Solved?, IEEE Transactions on Medical Imaging, vol. 37, Issue 11, Nov. 2018.

(Continued)

*Primary Examiner* — Myron Wyche

(57) ABSTRACT

A value indicative of an ejection fraction, EF, of a cardiac chamber of a heart is based on a temporal sequence of cardiac magnetic resonance, CMR, images of the cardiac chamber. A neural network system has an input layer configured to receive the temporal sequence of a stack of slices of the CMR images along an axis of the heart. The temporal sequence is one or multiple consecutive cardiac cycles of the heart. The neural network system has an output layer configured to output the value indicative of the EF based on the temporal sequence. The neural network system has interconnections between the input layer and the output layer and is trained with a plurality of datasets. Each of the datasets comprises an instance temporal sequence of the stack of slices of the CMR images along the axis over one or multiple consecutive cardiac cycles for the input layer and an associated instance value indicative of the EF for the output layer.

21 Claims, 8 Drawing Sheets

(56) References Cited

OTHER PUBLICATIONS

Tao Q et al., Deep Learning-based Method for Fully Automatic Quantification of Left Ventricle Function from Cine MR Images: A Multivendor, Multicenter Study, Radiology. Jan. 2019;290(1):81-88.

Bai W et al., Automated cardiovascular magnetic resonance image analysis with fully convolutional networks., J Cardiovasc Magn Reson. Sep. 14, 2018;20(1):65.

Ariel H.Curiale et al., Automatic quantification of the LV function and mass: A deep learning approach for cardiovascular MRI, Computer Methods and Programs in Biomedicine, vol. 169, Feb. 2019, pp. 37-50.

Alexander Ratner et al., Data Programming: Creating Large Training Sets, Quickly, https://arxiv.org/abs/1605.07723 (2016).

Julian Krebs et al., Unsupervised Probabilistic Deformation Modeling for Robust Diffeomorphic Registration, DLMIA 2018, ML-CDS 2018, pp. 101-109, 2018.

Asch, Federico M., et al. "Automated echocardiographic quantification of left ventricular ejection fraction without volume measurements using a machine learning algorithm mimicking a human expert." Circulation: Cardiovascular Imaging 12.9 (2019): e009303.

Wikipedia: „Ejektionsfraktion; Internet Excerpt Wikipedia—Die freie Enzyklopädie; Bearbeitungsstand; Aug. 25, 2019 pp. 1-3; URL: https://de.wikipedia.org/w/index.php?

Xue, Wufeng et al: "Full left ventricle quantification via deep multitask relationships learning"; Medical image analysis; vol. 43; Sep. 28, 2017; pp. 54-65; URL: https://doi.org/10.1016/j.media.2017.09.005 / Sep. 28, 2017.

"Kong Bin et al: "Recognizing End-Diastole and End-Systole Frames via Deep Temporal Regression Network"", Oct. 2, 2016 (Oct. 2, 2016), Image Analysis and Recognition : IITH International Conference, ICIAR 2014, Vilamoura, Portugal, Oct. 22-24, 2014, Proceedings, Part I; In: Lecture Notes in Computer Science, ISSN 1611-3349 ; vol. 8814; [Lecture Notes in Computer Science; Lect.No, XP047364484.

Pröve, Paul-Louis: "Blogartikel: Squeeze-and-Excitation Networks"; Towards Data Science; Oct. 1, 2017; p. 1-5; URL: https://towardsdatascience.com/squeeze-andexcitation-networks-9ef5e71eacd7.

Dezaki, Fatemeh Taheri et al: "Cardiac phase detection in echocardiograms with densely gated recurrent neural networks and global extrema loss"; IEEE transactions on medical imaging; vol. 38; No. 8; Aug. 2019; pp. 1821-1832; URL: https://doi.org/10.1109/TMI.2018.2888807.

Poudel, Rudra PK, Pablo Lamata, and Giovanni Montana. "Recurrent fully convolutional neural networks for multi-slice mri cardiac segmentation." International Workshop on Reconstruction and Analysis of Moving Body Organs. Springer, Cham, 2016.

Amirrajab, Sina et al: "XCAT-GAN for Synthesizing 3D Consistent Labeled Cardiac MR Images on Anatomically Variable XCAT Phantoms"; arXiv preprint arXiv:2007.13408v1; Jul. 31, 2020; pp. 1-12; https://arxiv.org/abs/2007.13408v2.

* cited by examiner

US 11,995,823 B2

TECHNIQUE FOR QUANTIFYING A CARDIAC FUNCTION FROM CMR IMAGES

RELATED APPLICATION

This application claims the benefit of DE 10 2020 211 736.5, filed Sep. 18, 2020, and EP 20465559.1, filed on Sep. 18, 2020, which are hereby incorporated by reference in their entirety.

FIELD

The present disclosure relates to a technique for determining a cardiac function from cardiac magnetic resonance (CMR) images. More particularly, a neural network system, a device, a method and a computer readable storage medium are provided for determining and/or quantifying a value indicative of an ejection fraction (EF) of a cardiac chamber (e.g., a left ventricle, LV) from CMR images taken over one or multiple consecutive cardiac cycles.

TECHNICAL BACKGROUND

The ejection fraction (EF) is the most important metric of cardiac function utilized conventionally by clinicians. Clinical decision-making and patient management in several cardiovascular conditions (e.g., heart failure) largely rely on the left ventricular (LV) ejection fraction (LV-EF) as the primary measure of LV function. Furthermore, the EF is a good predictor of adverse outcomes in heart failure when below around 45%, as discussed in the context of indirectly measured LV-EF from two-dimensional echocardiography by M. Cikes M et al. in "Beyond ejection fraction: an integrative approach for assessment of cardiac structure and function in heart failure", Eur Heart J. 2016 Jun. 1; 37(21): 1642-50.

The gold standard in quantifying cardiac function, including EF, is presently based on CMR imaging. Various semi-automated or fully automated approaches for LV-EF quantification from CMR imaging have been proposed. Training of convolutional neural networks (CNNs) by manually annotated CMR image datasets for performing automatic LV detection and LV segmentation for deriving quantities such as an LV end-diastolic volume (LV-EDV) and the LV-EF from the LV segmentation are, e.g., described by O. Bernard et al. in "Deep Learning Techniques for Automatic MRI Cardiac Multi-Structures Segmentation and Diagnosis: Is the Problem Solved?, IEEE Transactions on Medical Imaging", Vol. 37, Issue 11, Nov. 2018; Q. Tao et al. in "Deep Learning-based Method for Fully Automatic Quantification of Left Ventricle Function from Cine MR Images: A Multivendor", Multicenter Study, Radiology. 2019 January; 290 (1):81-88; W. Bai et al. in "Automated cardiovascular magnetic resonance image analysis with fully convolutional networks", J Cardiovasc Magn. Reson. 2018 Sep. 14; 20(1): 65; and A. H. Curiale et al., "Automatic quantification of the LV function and mass: A deep learning approach for cardiovascular MRI, Computer Methods and Programs in Biomedicine", Volume 169, February 2019, Pages 37-50; wherein the best performances were obtained by deep neural networks.

Almost all previously reported approaches rely on methods performing LV segmentation first, and then subsequently determining the LV-EF during a post-processing step. The disadvantage of such an approach is that a large number of manually annotated datasets are required for model training.

Previous work on determining the LV-EF without explicit for egoing LV segmentation has been reported in the field of echocardiography by F. M. Asch et al. in "Automated Echocardiographic Quantification of Left Ventricular Ejection Fraction Without Volume Measurements Using a Machine Learning Algorithm Mimicking a Human Expert", Circulation: Cardiovascular Imaging. 2019; 12:e009303.

Clinical practice for EF quantification still relies conventionally on manual annotations on the LV at end-systole (ES) and end-diastole (ED). Such manual annotations are a time-consuming process and prone to large errors.

SUMMARY

Accordingly, there is a need for an efficient technique for determining and/or quantifying a cardiac function from CMR imaging. Alternatively, or in addition, there is a need for an automated technique for determining and/or quantifying a cardiac function without performing an explicit segmentation and/or without the need for explicit anatomical structure annotations. Alternatively, or in addition, there is a need for improving a CMR image acquisition protocol without interrupting the ongoing CMR image acquisition.

As to a first aspect, a neural network system for outputting a value indicative of an ejection fraction (EF) of a cardiac chamber of a heart based on a temporal sequence of CMR images of the cardiac chamber is provided. The neural network system includes an input layer configured to receive the temporal sequence of a stack of slices of the CMR images along an axis of the heart (e.g., along a short-axis, SAX, and/or along a long axis, LAX, of the heart). The temporal sequence includes one or multiple consecutive cardiac cycles of the heart. The neural network system further includes an output layer configured to output the value indicative of the EF of the cardiac chamber based on the temporal sequence of the stack of slices of the CMR images along the axis (e.g., SAX and/or LAX) of the heart. The neural network system with interconnections between the input layer and the output layer is trained by a plurality of datasets. Each of the datasets includes an instance temporal sequence of the stack of slices of the CMR images along the axis (e.g., SAX and/or LAX) over one or multiple consecutive cardiac cycles for the input layer and an associated instance value indicative of the EF for the output layer.

The cardiac chamber may relate to the left ventricle (LV) of a human heart. The EF of the LV may shortly be denoted as LV-EF. Alternatively, or in addition, the cardiac chamber may relate to the right ventricle (RV) of the human heart. The EF of the RV may shortly be denoted as RV-EF. Further alternatively, or in addition, the EF may relate to the left atrium (LA) of the human heart. The EF of the LA may shortly be denoted as LA-EF. Alternatively, or in addition, the EF may relate to the right atrium (RA) of the human heart. The EF of the RA may shortly be denoted as RA-EF.

The output of the neural network system may include the value of the EF (e.g., directly) of a cardiac chamber (e.g., LV). Alternatively, or in addition, the output of the value indicative of the EF may include two values, one for an end-diastolic volume (EDV) and one for an end-systolic volume (ESV) of the cardiac chamber (e.g., LV). The EF for the cardiac chamber (e.g., LV) may be determined based on (e.g., the difference of) the two volumetric values (e.g., EF=(EDV−ESV)/EDV).

The value indicative of the EF may include a quantification of the cardiac function. For example, the EF and/or EDV and/or ESV may be quantified. Alternatively, or in addition, the quantification may include a mapping of the value indicative of the EF to a classification of (e.g., normal and/or abnormal) cardiac function.

Determining the value indicative of the EF and/or a value indicative of a cardiac function may also be denoted as estimating the value indicative of the EF and/or the value indicative of the cardiac function. Alternatively, or in addition, determining the value indicative of the EF and/or the value indicative of the cardiac function may also be denoted as predicting the value indicative of the EF and/or the value indicative of the cardiac function.

The temporal sequence of a stack of (e.g., two-dimensional) slices of the CMR images may also be denoted as a stack of temporal slices of CMR images. For example, data at the input layer (e.g., input data) may be implemented as a stack of slices and each slice in the stack may have a temporal dimension. The expression "temporal sequence of a stack of slices of the CMR images" may or may not construe a certain order of temporal and spatial dimensions. For example, the data (e.g., as acquired and/or received at the input layer) may be slice-by-slice and not timepoint-by-timepoint.

A stack may include one or more slices (e.g., 1 to 20 slices) along the axis (e.g., SAX). A stack of slices may alternatively be denoted as a (e.g., spatial) set of slices, wherein a slice may be an image slice in diverse orientation. By including multiple (e.g., from basal to apical along SAX) slices, a three-dimensional view of the heart may be obtained. Alternatively, or in addition, a slice may be taken over one or more points in time (also: "timepoints", e.g., 1 to 50 timepoints) over one ore multiple consecutive cardiac cycles. The set of timepoints of a slice may include and/or correspond to the temporal slice.

The value indicative of the EF may be determined and/or output in real time (e.g., during an ongoing CMR image acquisition).

Outputting of the value indicative of the EF may be based on a multi-task approach. E.g., the output may include values of the EDV and ESV, and optionally one or more further cardiac metrics. Alternatively, or in addition, the output of one or more further cardiac metrics may be of heterogeneous type (e.g., including a hemodynamic index and/or a wall thickness of a cardiac chamber).

A temporal sequence of CMR images may also be denoted as cine CMR images. A (e.g., single) CMR image representing a (e.g., distinct) timepoint in the cardiac cycle may be denoted as a frame. A stack of cine CMR images may include one or more (e.g., 1 to 20) temporal slices. Each temporal slice may include one or more frames (e.g., 1 to 50) of CMR images acquired over one or multiple consecutive cardiac cycles. Alternatively, or in addition, each temporal slice may represent and/or include one or multiple consecutive cardiac cycles.

A stack of slices of a temporal sequence of CMR images (shortly: "cine CMR images") may include a plurality of (e.g., spatially) two-dimensional CMR images (denoted as "slices") at any given time (e.g., any timepoint). The stack of cine CMR image slices at any given time (e.g., any timepoint) may provide a momentary and/or an instantaneous (e.g., spatially) three-dimensional CMR image.

The axis of the heart may include a short axis (SAX). Slices along SAX may be approximately perpendicular to the main (e.g., longitudinal along a patient's body) axis of the heart. Typically, several (e.g., 10 to 20) slices (e.g., along SAX) may be acquired to cover the (e.g., whole) heart. The stack of slices may include all of the slices for covering the whole heart. Alternatively, or in addition, the stack of slices may include a subset of the slices required to cover the whole heart. The stack of slices may in particular include the cardiac chamber for which the value of the EF is to be output. A slice along SAX may also be denoted as SAX view.

Alternatively, or in addition, the axis of the heart may include a long axis (LAX). Slices along LAX may be approximately perpendicular to SAX and/or be approximately parallel to the main axis of the heart. Slices along LAX may conventionally be acquired in a 2-chamber, 3-chamber and/or 4-chamber orientation. A slice along the 2-chamber LAX may represent the LV and LA. A slice along the 3-chamber LAX may represent the LV, RV and LA. Alternatively, or in addition, a slice along the 3-chamber LAX may represent the LV (with Ao), the RV and the LA. A slice along the 4-chamber LAX may represent all four chambers of the heart (LA, RA, LV and RV). A slice along LAX may also be denoted as LAX view. Any of the LAX slices may include the cardiac chamber for which the value indicative of the EF is to be output.

Further alternatively, or in addition, the CMR images along the axis of the heart may include CMR images along at least one axis (e.g., SAX and/or any of the 2-, 3- and 4-chamber LAX). Still further alternatively, or in addition, the CMR images along the axis of the heart may include the CMR images along at least one axis of the heart. The stack (or set) of slices of the CMR images along two axes of the heart may also be referred to as multi-axial stack.

A value (also denoted as a quantification) of the EF may include a numerical value of the EF. Alternatively, or in addition, a value of the EF may include at least three classes (also denoted as "bins" or "categories"), e.g., denoted as "normal" and/or "preserved" (e.g., LV-EF≥50%), "moderately reduced" (e.g., 40≤LV-EF≤49%) and "reduced" (e.g., LV-EF<40%). The classification may be further refined and/or may include more than three classes.

The determination of the value indicative of the EF may be performed without (e.g., without foregoing) explicit segmentation of the cine CMR images. Herein, segmentation may relate to an explicit delineation or contouring of the blood pool and/or the heart muscle and the cardiac chambers (e.g., based on the anatomical location of the cardiac chamber in accordance with the American Heart Association, AHA, segmentation model).

Alternatively, or in addition, the interconnections (e.g., interconnections between neurons of the input layer and one or more hidden layers and/or the interconnections of one or more hidden layers and the output layer, and/or weights of neurons of any layer) of the neural network system may be trained to directly (e.g., without precedent and/or anterior segmentation and/or precedent and/or anterior delineation of the endocardium and/or the blood pool within the cardiac chamber) quantify the EF and/or determine the value indicative of the EF of the cardiac chamber from the stacks of cine CMR image slices taken over one or multiple consecutive cardiac cycles.

The neural network system may include an input layer, an output layer and in between one or more hidden layers. Each layer may include a plurality of neurons. The interconnections may include any connection (e.g., data connection) between neurons of different (e.g., consecutive) layers. Alternatively, or in addition, the interconnections between neurons pertaining to different layers may include weights (e.g., assembled in a weight vector). The (e.g., vector of) weights may also be denoted as bias or filter.

The datasets (also referred to as training data) may be included in a training database. The training database may include a plurality of manually annotated real temporal sequences of stacks of slices of CMR images with the annotations including associated values indicative of the EF. Each manually annotated stack of real cine CMR images along with the associated value indicative of the EF may correspond to a (e.g., specific) patient.

Alternatively, or in addition, the training database may include synthetic datasets. The synthetic datasets may be based on deformations from and/or re-parametrizations of real datasets, e.g., using a coronary artery anatomical model. The synthetic datasets may be generated, e.g., by a previously trained convolutional neural network (CNN) for image generation.

Annotations (e.g., at end-systole, ES, and at end-diastole, ED) may be fully automated efficiently using the technique described herein. Alternatively, or in addition, deep learning-based techniques as described herein for fully automated EF quantification from cine CMR imaging do not require explicit anatomical structure annotations for model training and/or determining the cardiac function and/or the value indicative of the EF.

The technique, particularly the neural network system, may be computer-implemented.

The axis of the heart may include a short axis (SAX). Alternatively, or in addition, the axis may include a long axis (LAX). The slices along LAX may intersect with two, three or four cardiac chambers of the heart including the cardiac chamber for which the value indicative of the EF is output.

The input layer may be further configured to receive data representative of cardiac images acquired from imaging procedures other than CMR, optionally from echocardiography.

Echocardiography may also be denoted as echocardiogram, cardiac echo or shortly echo.

The (e.g., apical) 2-chamber view may include the LV and the LA. Optionally, the (e.g., apical) 2-chamber view may further include the mitral valve (MV) between the LA and the LV.

The (e.g., apical) 3-chamber view may include the LV, the LA and the Ao. Optionally, the (e.g., apical) 3-chamber view may further include the MV between the LA and the LV as well as the aortic valve (AV) between the LV and the Ao.

The (e.g., apical) 4-chamber view may include the LV, the RV, the LA and the RA. Optionally, the (e.g., apical) 4-chamber view may further include the MV between the LA and the LV as well as the tricuspid valve (TV) between the RA and the RV.

The neural network system with interconnections and/or the output layer may be further configured to determine a numerical value indicative of the EF. Alternatively, or in addition, the neural network system with interconnections and/or the output layer may be configured to classify the EF according to a finite set of classes.

The output of the value indicative of the EF may correspond to a numerical value of the EF and/or an EF-class of the EF. Alternatively, or in addition, the output of the value indicative of the EF may correspond to a numerical value of the EDV and/or ESV.

The numerical value indicative of the EF may be determined by regression. Alternatively, or in addition, classifying the EF may include a finite number of threshold values of the EF. Each EF class may correspond to a range of the value of the EF between two (e.g., consecutive) threshold values. Alternatively, or in addition, the EF may be determined as a fraction (e.g., a percentage) of the blood ejected at the ES relative to ED. Alternatively, or in addition, determining a numerical value indicative of the EF may include determining a numerical value of the EDV and a numerical value of the ESV. The numerical value of the EF may be obtained from the difference of the numerical values of the EDV and the ESV normalized by the numerical value of the EDV (e.g., $EF=(EDV-ESV)/EDV$).

The training of the neural network system with interconnections between the input layer and the output layer may include training by a plurality of datasets. Each dataset may include the temporal sequence of a stack of slices of the CMR images along SAX. Alternatively, or in addition, each dataset may include the temporal sequence of a stack of slices of the CMR images along LAX, the slices intersecting with 2, 3 or 4 cardiac chambers of the heart including the cardiac chamber for which the value indicative of the EF is output. Alternatively, or in addition, each dataset may include at least one cardiac image acquired from imaging procedures other than CMR, optionally from echocardiography. Still further Alternatively, or in addition, each dataset may include data representative of a prior medical examination.

The data representative of a prior medical examination may include a visual EF class estimation by an observer (also: trained expert or clinician). Alternatively, or in addition, the data representative of a prior medical examination may include a value indicative of the EF from alternative imaging procedures (e.g., from echocardiography).

The training using different types of datasets may include associating and/or pooling the datasets per patient.

The value indicative of the EF may be iteratively determined as the temporal sequence of the stack of slices of the CMR images becomes available.

The neural network system may be implemented and/or implementable at an MRI device. Alternatively, or in addition, the neural network system may be in (e.g., direct) data connection with the MRI device. The input of the cine CMR images to the neural network may be forwarded (e.g., directly and/or promptly and/or "inline") from the MRI device after acquisition and/or as soon as they become available.

For example, the value indicative of the EF may be determined and/or (e.g., iteratively) updated as the cine CMR image acquisition takes place. Responsive to the prompt output of the determined and/or (e.g., iteratively) up-dated value indicative of the EF (e.g., including a low confidence metric), a user of a magnetic resonance imaging (MRI) device (also: MRI scanner or MRI apparatus) may decide to change the axis of the cine CMR image acquisition as it is taking place. Thereby, the need for a later second appointment and/or cine CMR image acquisition cycle for the same patient may be avoided.

The output layer may be further configured to output a confidence metric of the value indicative of the EF.

The confidence metric may relate to the quality (e.g., the resolution) and/or the consistency (e.g., mutual) of the CMR images and/or cardiac images acquired from other imaging procedures. Alternatively, or in addition, the confidence metric may relate to a variance of values indicative of the EF obtained from different subsets of slices and/or epochs of the temporal sequence of the stack of slices of the CMR images and/or of the other imaging procedures.

The input layer may be further configured to selectively receive a further temporal sequence of a stack of slices of the CMR images depending on the output value indicative of the EF based on the temporal sequence of a stack of slices of the CMR images along the axis (e.g., SAX).

The further temporal sequence may include a further stack of slices of CMR images along the (e.g., first) axis (e.g., SAX). Alternatively, or in addition, the further temporal sequence may include a stack of slices of CMR images along a different view and/or an axis different from the (e.g., first) axis (e.g., LAX).

The confidence metric of the value indicative of the EF may be improved by regressively determining the value indicative of the EF as the further (or any further) temporal sequence of a stack of slices of CMR images becomes available.

The stack of slices of the CMR images may include at least an ED frame and at least an ES frame. Optionally, the stack of slices of the CMR images may further include one or multiple (e.g., intermediary) frames at different timepoints within the cardiac cycle.

The neural network system may further include at least one of the following two sub-networks. A first sub-network of the two sub-networks may be configured to identify spatial positions of the slices of the temporal sequence of the stack of slices of the CMR images along the axis (e.g., SAX and/or LAX). The spatial positions may include an apical region, a basal region and/or an intermediate region of the cardiac chamber. A second sub-network may be configured to identify temporal instances of the stack of slices of the CMR images along the axis (e.g., SAX and/or LAX). The temporal instances may include at least one of ED, ES and an intermediary timepoint.

The two sub-networks may be located (e.g., directly) after the input layer. By employing the two sub-networks and providing their outputs to (e.g., further hidden layers of) the neural network system dedicated to determining the value indicative of the EF (and optionally one or more further cardiac metrics), the neural network system dedicated to determining the value indicative of the EF (or any further cardiac metric) may only be required to process relevant data (e.g., only ED and ES frames) as their respective input.

The two sub-networks configured to identify spatial positions (by the first sub-network) and temporal instances of the cardiac cycle (by the second sub-network) of the stack of temporal slices of the CMR images along the SAX and/or the LAX may be trained and/or employed (also: "used") jointly with or in parallel to, e.g., further hidden layers of the neural network system for outputting the value indicative of the EF. Alternatively, or in addition, the two additional sub-networks and the, e.g., hidden layers of the neural network system for outputting a value indicative of the EF may be combined in a multi-task neural network system framework.

For example, the two sub-networks for identifying spatial positions and temporal instances may form part of a cascaded neural network architecture. Alternatively, or in addition, the outputs of the two sub-networks for identifying spatial positions and temporal instances may be part of the input of (e.g., further) hidden layers and/or sub-networks of the neural network system dedicated to outputting the value indicative of the EF.

The one or more further cardiac metrics may include at least one of a linear size (e.g., a diameter of one of the valves, MV, AV and/or Tv, or of an outflow tract of a cardiac chamber, e.g., LV), a volume (or volumetric size), a mass and an elasticity. The linear size may include an (e.g., time-dependent) diameter of, e.g., the blood pool of, a cardiac chamber (e.g., LV and/or RV) and/or the thickness of a wall of the cardiac chamber (e.g., LV wall and/or RV wall). Alternatively, or in addition, the volumetric size may include an, e.g., time-dependent, volume of the cardiac chamber (e.g., LV and/or RV). The time-dependency of the volume may relate to an ES volume and/or an ED volume. Alternatively, or in addition, the elasticity may include a (e.g., regional) wall motion score index. Herein, "regional" or "local" may relate to a frame of reference of the heart, e.g., pursuant to the 17-segments of the AHA segmentation model.

The neural network system may further include a first sub-network, which includes a feature extractor network. The feature extractor network may be configured to output features of the temporal sequence of the stack of slices (briefly: temporal slices) of the CMR images along the axis (e.g., SAX and/or LAX) received from the input layer. The feature extractor network may optionally include an encoder sub-network and a recurrent sub-network (RNN).

The feature extractor network may include and/or be implemented by a CNN. Alternatively, or in addition, the encoder sub-network may receive frames as input and encode them into a latent space representation. For fast and accurate convergence, the encoder weights (e.g., of the neurons of the encoder sub-network) may be initialized by a segmentation training. The segmentation training may be performed on CMR images and/or images acquired from procedures other than CMR. Alternatively, or in addition, the RNN may correlate spatial information from different slices and/or from different frames within the same slice. Any one of the feature extractor network, the encoder sub-network and the RNN may include multiple instances of the respective network. Each instance of the respective network may receive a different (e.g., SAX and/or LAX) slice as input.

Alternatively, or in addition, the neural network system may further include a second sub-network which includes a squeeze and excitation (SE) network. The SE network may be configured to receive the output of the first sub-network as input. The SE network may further be configured to model interdependencies between features, which are output by the feature extractor network, from and/or of at least two different slices and/or frames.

The SE network may receive features from multiple instances of the feature extractor network as input. For example, the input may include features based on different SAX and/or LAX slices. Alternatively, or in addition, the input may include features based on imaging procedures other than CMR, e.g., from echocardiography. Further Alternatively, or in addition, the SE network may model interdependencies between features based on CMR images along different axes (e.g., SAX and LAX) and/or different (e.g., 2, 3 or 4) chamber views along LAX and/or images obtained from imaging procedures different from CMR.

Alternatively, or in addition, the neural network system may include a third sub-network which includes a classifier network. The classifier network may be configured to classify the features encoded by the feature extractor network. Optionally, the classifier network may include an RNN.

The classification may include a temporal and/or spatial ordering of stacks and/or slices per stack of CMR images.

The training of the neural network system with interconnections may include an unsupervised training (also: "pretraining"). The unsupervised training may include: temporally ordering of at least two frames of the CMR images along the axis (e.g., SAX and/or LAX). The at least two frames of the CMR images may have been randomly reshuffled in advance. Alternatively, or in addition, the unsupervised training may include spatially ordering at least two slices of the CMR images along the axis (e.g., SAX and/or LAX). The at least two slices of the CMR images may have been randomly reshuffled in advance.

The reshuffling in advance may relate to an instance temporal sequence of the stack of slices of the CMR images within the dataset used for training the neural network system with interconnections.

The output of the neural network system may include one or more further cardiac metrics in addition to the value indicative of the EF. The one or more further cardiac metrics may be determined based on the received input to the input layer.

The one or more further cardiac metrics may be summarized in a report.

Alternatively, or in addition, the output of the neural network system may include a future treatment option based on the value indicative of the EF, optionally in combination with the one or more further cardiac metrics.

If the neural network system is running directly on the MRI device during CMR image acquisition, the neural network system may suggest changes in the imaging protocol of the cardiac exam, e.g., including the addition of other sequences and/or adding temporal slices along different axes to the imaging protocol. For example, a patient with severely reduced EF (e.g., determined based on a first temporal slice) may be automatically recommended for additional T1 T2 mapping or for additional cine CMR images. One or several options of how to modify the CMR imaging protocol may be shown and/or suggested to the user in the form of a decision tree following clinical imaging guidelines.

The one or more further cardiac metrics may relate to at least one of one or more hemodynamic indices, one or more linear sizes (e.g., a myocardial thickness), a volume (or volumetric size), a mass, and an elasticity. Alternatively, or in addition, any of the value indicative of the EF and the one or further cardiac metrics may be of heterogeneous type. The system may also suggest a clinical treatment option based on the function quantification (e.g., medication, pacemaker, implantable defibrillator). The system may suggest additional clinical tests (e.g., an additional MR sequence to be added to the exam). The system may also provide a risk score for cardiovascular events. The system may provide a disease quantification (severity of valve regurgitation, severity of myocardial hypertrophy, severity of dilated cardiomyopathy, etc.).

The future treatment options may include at least one of a recommendation for a medication, a date for a follow-up medical consultation, for implementing a pacemaker and for implementing a defibrillator.

The training of the neural network system and/or outputting each of the at least two different cardiac metrics may include assigning a different labeling function to each of the at least two different cardiac metrics. A domain of each of the labeling functions may include an abstain value. The abstain value may be assigned if no input data are available for the labeling function. Alternatively, or in addition, the abstain value may be assigned if the output does not include a decisive value.

Different labeling functions may correspond to different tasks of a multi-task learning and/or training. A training label may correspond to an output value of a labeling function (e.g., an annotation corresponding to a real dataset of CMR images).

The labeling function for the value indicative of the EF may include determining the output of the value indicative of the EF based on the input (e.g., cine) CMR images. Each labeling function may be specific to each one of a plurality of cardiac metrics and/or future treatment options to be determined and/or to be output. Determining and/or outputting a (e.g., specific) cardiac metric (e.g., a value indicative of the EF) and/or a future treatment option may be denoted as (e.g., specific) task.

The abstain value of the labeling function may relate to a task that is not performed for every patient. For example, a prior medical examination may not have taken place. Alternatively, or in addition, the abstain value may be assigned if the output does not include a decisive value. Alternatively, or in addition, the confidence metric of the estimated and/or determined value by the neural network system may be very low (e.g., the metric computation and/or the estimated value is imprecise and/or inaccurate). For example, the abstain value may be assigned if the value indicative of the RV-EF is very different from a value indicative of the LV-EF value and the neural network system cannot distinguish if the difference is an outlier or if one of the estimated and/or determined values (e.g., RV-EF) is incorrect. Alternatively, or in addition, the abstain value maybe used during training, when a label is missing (e.g., not provided) in the training data.

The training of the neural network system with interconnections may include generating a plurality of synthetic datasets. Each synthetic dataset may include an instance temporal sequence of the stack of slices of the CMR images along the axis (e.g., SAX and/or LAX) over one or multiple consecutive cardiac cycles for the input layer and an associated instance value indicative of the EF for the output layer.

The synthetic datasets may be generated by an encoder network. Alternatively, or in addition, the synthetic datasets may be generated by a (e.g., cycle) generative adversarial network (GAN). Optionally the GAN may be configured as adapted cycle GAN.

The GAN may synthetically generate temporal sequences of a stack of slices of CMR images based on deformations from and/or re-parametrization of real datasets (e.g., from healthy patients), e.g., using a motion model and/or a coronary artery anatomical model. Generating synthetic data may include a style transfer. A probability density of the synthetic datasets (e.g., as a function of the value indicative of the EF) may be complementary to a probability density of the real datasets.

The synthetically generated datasets may include values indicative of the EF of low prevalence in the real datasets used for training (e.g., including very low and/or very high values of the EF).

The output of the neural network system may be based on a motion heatmap and/or a motion history image.

The output may include the value indicative of the LV-EF and/or the RV-EF (e.g., a class such as "low", "normal" or "high"). The value indicative of the LV-EF and/or the RV-EF may be derived from the LV volume and/or the RV volume, respectively.

The motion history heatmap and/or motion history image may be generated by an encoder-decoder network. The encoder-decoder network may be trained to extract a motion model (also: "deformation vector field") from one or several temporal slices of CMR images. In unsupervised training, the network learns the motion model needed to deform every temporal frame into its neighboring (e.g., consecutive) frame. The motion model for one temporal slice may be collapsed into a single image template where the intensity is a function of recency of motion in a sequence called motion history image. The motion history image may be passed to and/or input into a classifier network and/or a RNN that determines if the patient has a low, reduced or normal EF or estimates a value indicative of the EF.

As to a second aspect, an MRI device is provided. The MRI device includes a neural network system according to the first aspect.

As to a third aspect, a method for outputting a value indicative of an EF of a cardiac chamber of a heart based on a temporal sequence of CMR images of the cardiac chamber using a neural network system is provided. The method includes an act of receiving, at an input layer, the temporal sequence of a stack of slices of the CMR images along an axis of the heart. The temporal sequence includes one or multiple consecutive cardiac cycles of the heart. The method further includes an act of outputting, at an output layer, the value indicative of the EF of the cardiac chamber based on the temporal sequence of the stack of slices of the CMR images along the axis of the heart. The method includes training the neural network system with interconnections between the input layer and the output layer by a plurality of datasets. Each of the datasets includes an instance temporal sequence of the stack of slices of the CMR images along the axis over one or multiple consecutive cardiac cycles for the input layer and an associated instance value indicative of the EF for the output layer.

The method may further include one or more act for the training and/or for the outputting of the value indicative of the EF using the neural network system according to or corresponding to any feature disclosed in the context of the first and/or the neural network system aspect.

As to a fourth aspect, a non-transitory computer readable storage medium (memory) storing computer program product is provided. The computer program product includes program code portions for performing any one of the steps of the third and/or the method aspect, when the computer program product is executed on one or more computing devices including a neural network system. The computer program product may also be provided for download, e.g., via a radio or cellular network, the Internet and/or a host computer. Alternatively, or in addition, the method may be encoded in a Field-Programmable Gate Array (FPGA) and/or an Application-Specific Integrated Circuit (ASIC), or the functionality may be provided for download by a hardware description language.

BRIEF DESCRIPTION OF DRAWINGS

Further details of embodiments of the technique are described with reference to the enclosed drawings, wherein.

DETAILED DESCRIPTION

In the following description, for purposes of explanation and not limitation, specific details are set forth, such as a neural network system including a plurality of hidden layers and/or sub-networks in order to provide a thorough understanding of the technique disclosed herein. It will be apparent to one skilled in the art that the technique may be practiced in other embodiments that depart from these specific details.

Figure 1:
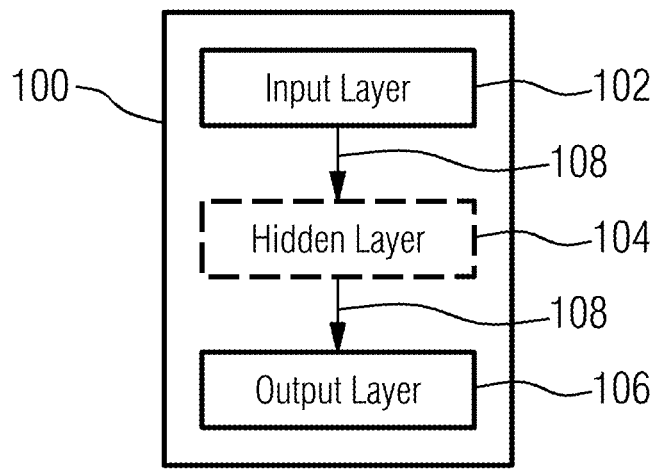
FIG. 1 shows an example schematic block diagram of a neural network system for determining a value indicative of an ejection fraction (EF) of a cardiac chamber based on a temporal sequence of CMR images.

FIG. 1 schematically illustrates an example block diagram of a neural network system for outputting a value indicative of an EF of a cardiac chamber of the heart based on a temporal sequence of CMR images of the cardiac chamber. The neural network system (neural network) is generally referred to by reference sign 100.

The neural network system 100 includes an input layer 102 that is configured to receive the temporal sequence of a stack of slices (briefly: "temporal slices") of the CMR images along an axis (e.g., SAX) of the heart. The temporal sequence includes one or multiple consecutive cardiac cycles.

The neural network system 100 further includes an output layer 106 that is configured to output the value indicative of the EF of the cardiac chamber based on the temporal slices of the CMR images along the axis (e.g., the SAX).

The neural network system 100 further includes interconnections 108 between the input layer 102 and the output layer 106. Optionally, the interconnections 108 may run through one or more hidden layers 104.

The neural network system 100 with interconnection 108 is trained by a plurality of datasets. Each of the datasets includes an instance temporal sequence of the stack of slices of the CMR images along the axis (e.g., SAX) over one or multiple consecutive cardiac cycles for the input layer and an associated instance value indicative of the EF for the output layer.

Figure 2:
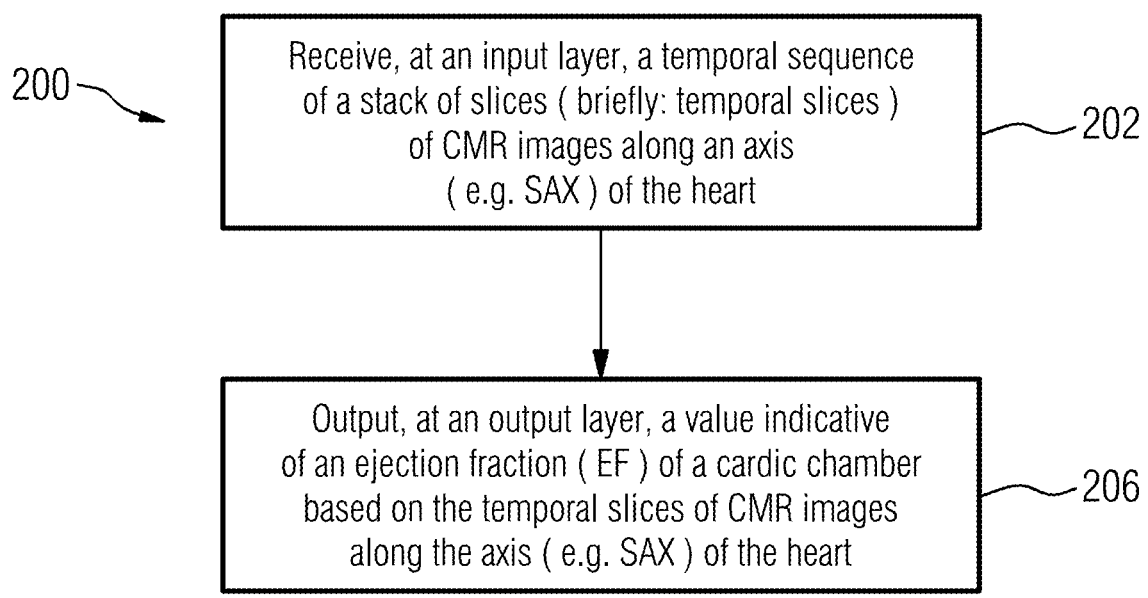
FIG. 2 shows an example flowchart of a method for determining a value indicative of an EF of a cardiac chamber based on a temporal sequence of CMR images using a neural network system, which neural network system may be implementable by the neural network system of FIG. 1.

FIG. 2 schematically illustrates an example flowchart for a method 200 for outputting a value indicative of an EF of a cardiac chamber of the heart based on a temporal sequence of CMR images of the cardiac chamber. The method 200 includes or initiates an act 202 of receiving, at an input layer, the temporal sequence of a stack of slices (briefly: "temporal slice") of the CMR images along an axis of the heart. The temporal sequence includes one or multiple consecutive cardiac cycles.

The method 200 further includes an act 206 of outputting the value indicative of the EF of the cardiac chamber based on the temporal sequence of the stack of slices of the CMR images along the axis of the heart.

The method 200 may be performed by the neural network system 100. For example, the input layer 102 and the output layer 106 may perform the receiving act 202 and the outputting act 206, respectively. Intermediate acts for outputting the value indicative of the EF may be performed by one or more hidden layers 104.

By the method 200, a novel artificial intelligence (AI) and/or deep learning (DL)-based technique for a fully automated EF quantification without the need for a foregoing explicit segmentation of the CMR images is provided.

A distinct effect or a distinguishing feature of the subject technique may include its deployment scenario. The method 200 may be performed directly on an MRI device to provide real-time feedback and insight, potentially modifying the CMR image acquisition sequence. The imaging protocol and/or the acquisition of temporal slices of CMR images (briefly: "cine CMR images") may be personalized based on the determined value indicative of the EF, e.g., while the CMR image acquisition is still ongoing (also denoted as "inline"). Since the method 200 does not rely on a fixed set of input cardiac views (e.g., it does not require a complete SAX and/or LAX coverage), the determination of the value indicative of the EF may be initiated at any time during the acquisition of cine CMR images.

The determination of the value indicative of the EF may, e.g., be performed in the absence of a complete SAX stack using some of the cine CMR images along the LAX. Based on the determination of the value indicative of the EF, a recommendation system may be implemented to alert the user appropriately, if the patient being scanned and/or examined falls into a reduced EF and/or high-risk category, in order to adapt the rest of the CMR image acquisition protocol accordingly. Since a clinical expert (e.g., a radiologist and/or cardiologist) is conventionally not available to verify the accuracy of the myocardial contours (e.g., produced by the traditional segmentation-based approach), the method 200 bypasses the segmentation act, e.g., completely.

The method 200 may be distinguished by the ability to detect the value indicative of the EF from multi-cycle cine CMR images (i.e., the temporal sequence of a stack of slices). With the advent of real-time cine CMR image acquisition, such a deployment scenario can be advantageous for MRI device fleets in the future.

The method 200 is based on one or more AI and/or DL models, using as input data, according to an embodiment, cine CMR images (also denoted as "CMR image stack of cine slices") along the SAX, and optionally, cine CMR images (also "CMR cine slices") along the LAX with 2-chamber, 3-chamber and/or 4-chamber orientations. Further optionally, the input data may include echocardiogram acquisitions, e.g., of the same patient.

Different formulations may be employed for the task of determining the value indicative of the EF. According to a first embodiment, a numerical value of the (e.g., LV) EF (or the EDV and ESV) may be determined by regression. According to a second embodiment, which is combinable with the first embodiment, the (e.g., LV) EF may be classified according to three categories proposed by the European Society of Cardiology Guidelines for the diagnosis and treatment of acute and chronic heart failure. The three categories may include, e.g., for the LV, normal (also denoted as "preserved") for LV-EF≥50%, moderately reduced for the LV-EF in the range of 40-49% and reduced for LV-EF<40%. More fine-grained classifications, e.g., using a larger number of categories, classes and/or bins, may also be employed.

As the method 200 includes determining the value indicative of the EF (e.g., LV-EF) without performing explicit segmentation, additional manual annotations of the cardiac chamber (e.g., the LV) should also not be required during the training process of the neural network system 100. The ground truth information required during the training process may be extracted from annotations performed in the past by clinicians to quantify the EF. Alternatively, or in addition, the ground truth information required during the training process may be extracted from medical reports, e.g., using natural language processing (NLP). NLP may, e.g., include subjective visually estimated EF class information. Alternatively, or in addition, the ground truth information required during the training process may be extracted from annotations performed on other types of medical images of the same patient (e.g., echocardiography).

All methods described herein may be employed for any of the four cardiac chambers (LV, RV, LA and/or RA).

In a first embodiment, details related to the real-time application of the EF quantification model during the CMR image acquisition (also: "MRI exam") are presented. A workflow includes iteratively determining the value indicative of the EF in real time during the MRI exam as new cine CMR images become available. Determining the value indicative of the EF may be performed and/or updated after each new acquisition of cine CMR images.

Alternatively, or in addition, the neural network system 100 and/or the model for determining the value indicative of the EF may output a confidence metric (e.g., by specifying upper and lower limits of confidence).

The confidence metric may be derived by analyzing the image quality. Alternatively, or in addition, the confidence metric may be derived by analyzing the value indicative of the EF as determined from different subsets of views (e.g., along different axes) and/or slices and/or frames of the cine CMR images.

Figure 3:
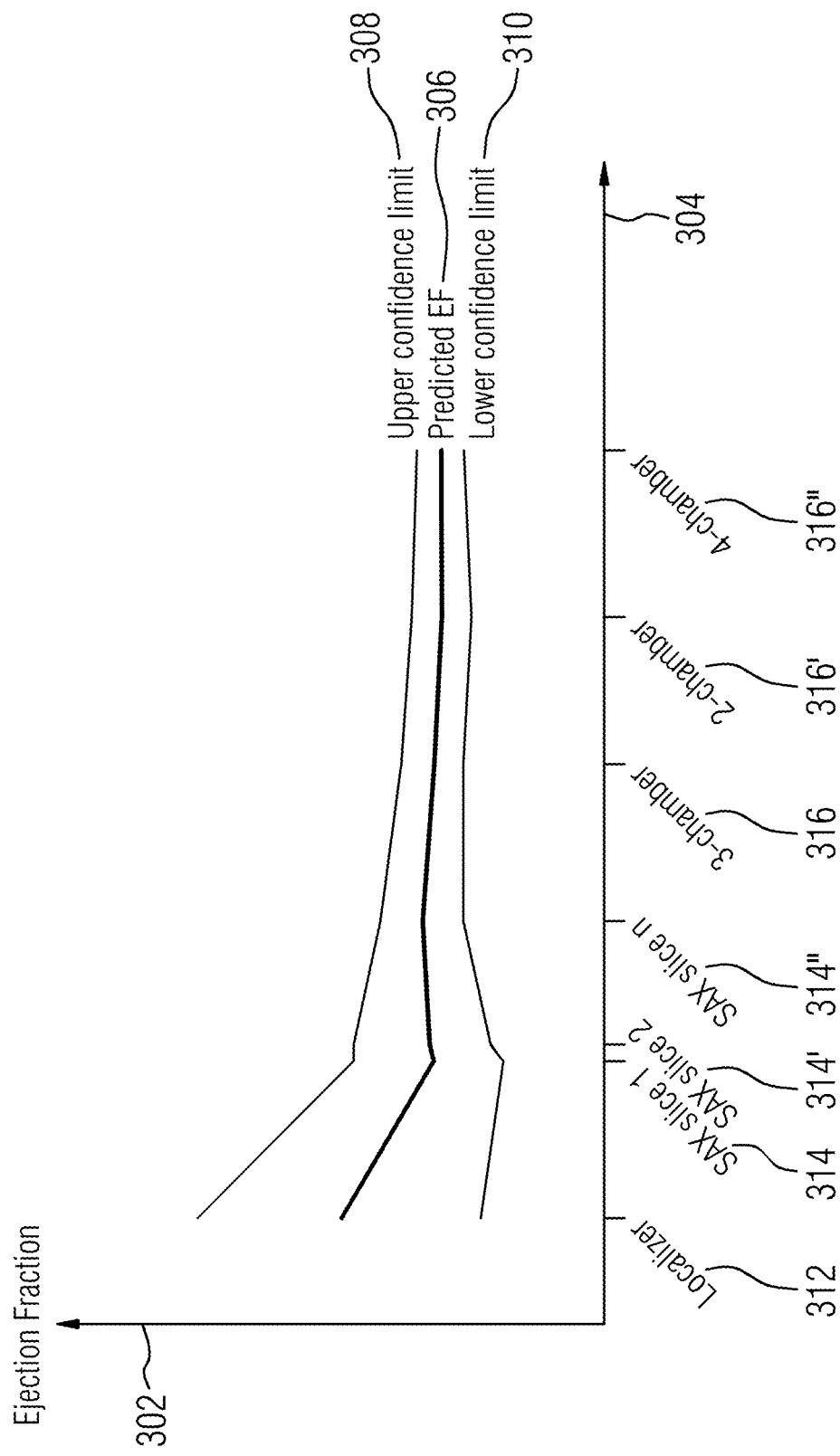
FIG. 3 shows an example evolution of a determined and/or iteratively updated value of the EF during a cine CMR image acquisition with changes of the axis over the cine CMR image acquisition time with upper and lower limits on the value of the EF based on a confidence metric.

FIG. 3 displays a sample evolution 306 of the determined and/or iteratively updated value of the EF 302 during the cardiac MRI sequence, e.g., with a first localizer 312 and several SAX slices 314, 314', 314" followed by 3-chamber, 2-chamber and 4-chamber LAX slices 316, 316', 316", respectively, taken over a time 304. FIG. 3 additionally displays the associated confidence metric in terms of an upper limit 308 and lower limit 310 of the value of the EF 302.

Furthermore, a decision support system may be defined to automatically and/or semi-automatically adapt the cine CMR image acquisition protocol depending on the determined value indicative of the EF. For example, a patient with severely reduced EF may be automatically recommended for additional T1 T2 mapping and/or for acquisition of additional cine CMR images along one or more different axes and/or views. The CMR acquisition protocol may be modified, e.g., by employing an additional AI and/or DL model and/or by a more basic approach like a decision tree. Alternatively, or in addition, a report may be generated at the end of the MRI exam to document the findings. The findings may include, e.g., a value indicative of the EF with confidence limits. Alternatively, or in addition, the findings may include proposed changes in the CMR acquisition protocol.

Figure 4:
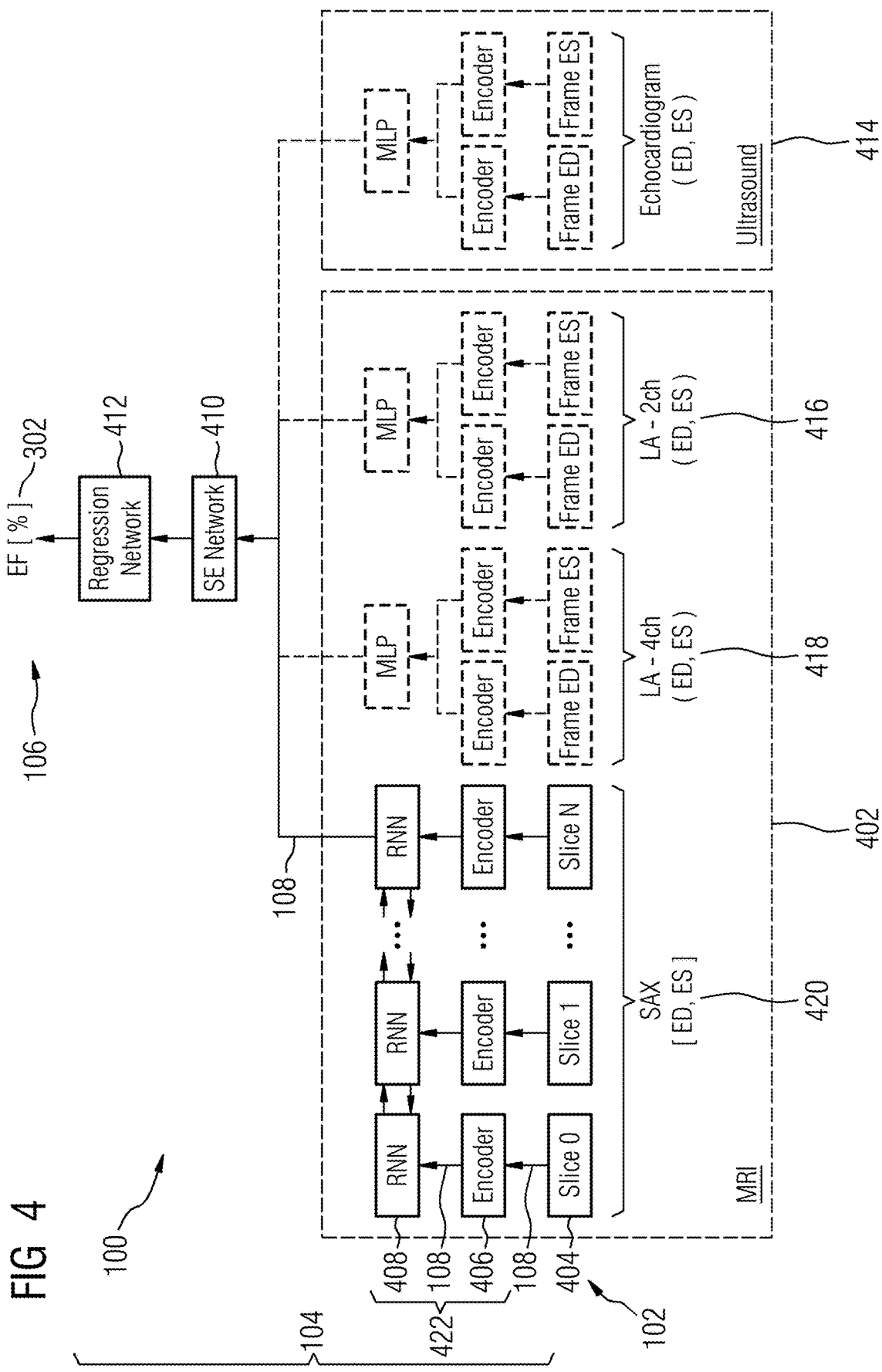
FIG. 4 shows an example architecture including a feature extractor network, which in turn includes an encoder and a recurrent neural network (RNN), a squeeze and excitation (SE) network and a regression network for outputting a value indicative of the EF, which architecture may form part and/or embody the neural network system of FIG. 1.

FIG. 4 displays a second embodiment of the neural network system 100 for EF quantification 302, which is combinable with any other embodiment disclosed herein. To perform EF quantification 302, at least the ED and ES frames, e.g., of basal to apical SAX 420 slices 404 and/or of LAX 4-chamber 418 and/or 2-chamber 416 views, are required. If all slices 404 and/or frames 404, e.g., as acquired in a CMR acquisition session, are used as input, an additional preprocessing step is required. Two, e.g., additional, deep neural networks (DNNs) may be employed at this stage as sub-networks of the neural network system 100. E.g., a first DNN may identify the basal, apical and/or intermediate slices 404. E.g., a second DNN may identify the ED, ES and/or intermediate frames 404. Identifying the ED, ES and/or intermediary frames may be especially relevant for multi-cycle cine CMR image series, where multiple ED-ES intervals could be identified and subsequently used for determining the value indicative of the EF.

By employing the, e.g., additional, DNNs at reference sign 404, it may be ensured that only relevant data are used as input, e.g., to further hidden layers 104 such as a hidden layer 104 including an encoder network 406 and/or as input to the output layer 106. By ensuring that only relevant data are used as input, e.g., to the encoder network 406, the accuracy of determining the value indicative of the EF 302 and/or of determining any (e.g., further) cardiac function and/or cardiac metric may be improved.

In the second embodiment, regardless of the input type (e.g., SAX slices 404 and/or LAX frames 404), a feature extractor network 422 may be employed in the first (e.g., hidden) layer 106. The output features of the feature extractor network 422 may be fed into a squeeze and excitation (SE) network 410, which adaptively recalibrates channel-wise feature responses by explicitly modelling interdependencies between multiple instances of the feature extractor network 422 (also denoted as "channels"). The SE network 410 may obtain further input from non-CMR image data such as from a network processing echocardiogram-related data at reference sign 414.

Another (e.g., regression) network 412 may process the output features of the SE network 410 to determine the value indicative of the EF 302, e.g., as a percentage of the difference of EDV and ESV relative to EDV.

A possible architecture for the feature extractor network 422 may combine two separate neural network architectures 406 and 408 as depicted in FIG. 4. First, an encoder network 406 may take frames 404 and/or slices 404 as input. The encoder network 406 may encode the frames 404 and/or slices 404 into a latent space representation. Alternatively, or in addition, for a faster and more accurate convergence (e.g., compared to a random initialization of the weights of the hidden layers of the neural network system), the encoder weights (e.g., of the encoder network 406) may be initialized by performing a segmentation pre-training (not necessarily on CMR data). Secondly, an RNN 408 may correlate spatial information between slices 404 and/or frames 404.

In a third embodiment, which is combinable with any other embodiment disclosed herein, self-supervision approaches may be employed to perform an efficient training (also denoted as "pre-training") of large parts of the neural network system 100 employed for EF quantification. In the self-supervised learning schematically depicted in FIG. 5, training data (e.g., a plurality of slices 404 and/or of frames 404) is autonomously and/or automatically labelled. The training may still include supervised learning, but the datasets do not need to be manually annotated.

To efficiently train the neural network system 100 for EF quantification, the following self-supervised tasks may be defined. SAX slices 404 and/or LAX frames 404 may be temporally ordered. Alternatively, or in addition, SAX slices 404 and/or LAX frames 404 may be spatially and/or temporally ordered.

To order the frames 404 and/or slices 404, the neural network system 100 has to be able to analyze the cardiac chamber (e.g., LV) and its variations in time and space, which represents a highly relevant exercise for EF quantification 302.

The frame 404 and/or slice 404 ordering may be formulated as a multi-class classification task. For each tuple N of frames 404 and/or slices 404, there are N! possible permutations.

Figure 5:
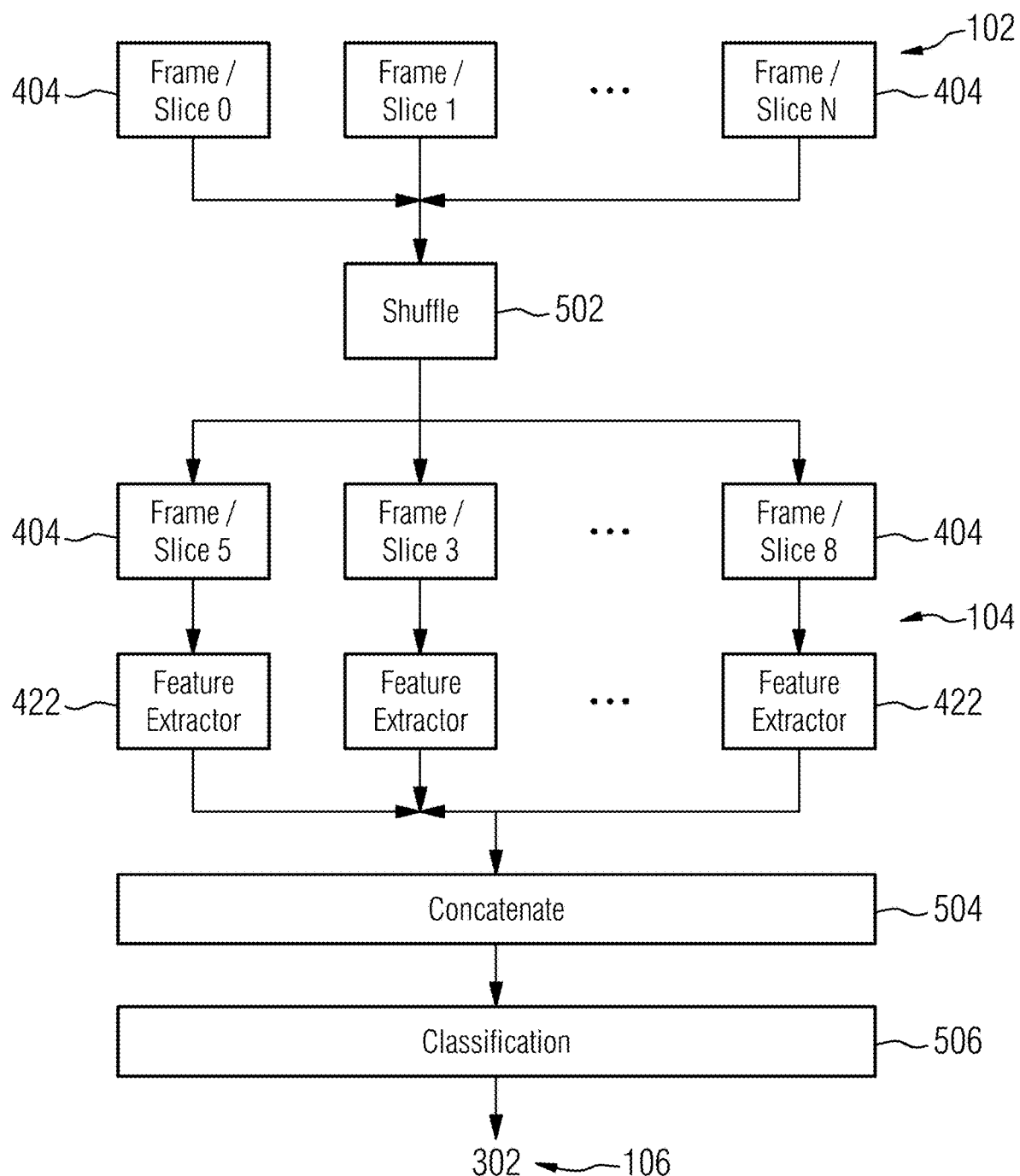
FIG. 5 shows an example flowchart of a self-supervised training of a neural network system using reshuffling of slices and/or frames of cine CMR images, which neural network system may be implementable by the neural network system of FIG. 1.

A possible approach of training by formulating a multi-class classification task is described in connection with FIG. 5. For training, frames 404 and/or slices 404 are shuffled at reference sign 502, either randomly or by using, e.g., a magnitude of an optical flow. Features from each frame 404 and/or slice 404 may be encoded by a feature extractor network 422, e.g., a CNN. Features may be concatenated at reference sign 504 and fed into a classifier network at reference sign 506, which may be based on an RNN architecture, e.g., similar the RNN 408.

In a fourth embodiment, which is combinable with any other embodiment disclosed herein, a multi-task learning approach based on data programming may be employed as described in connection with FIG. 6.

Figure 6:
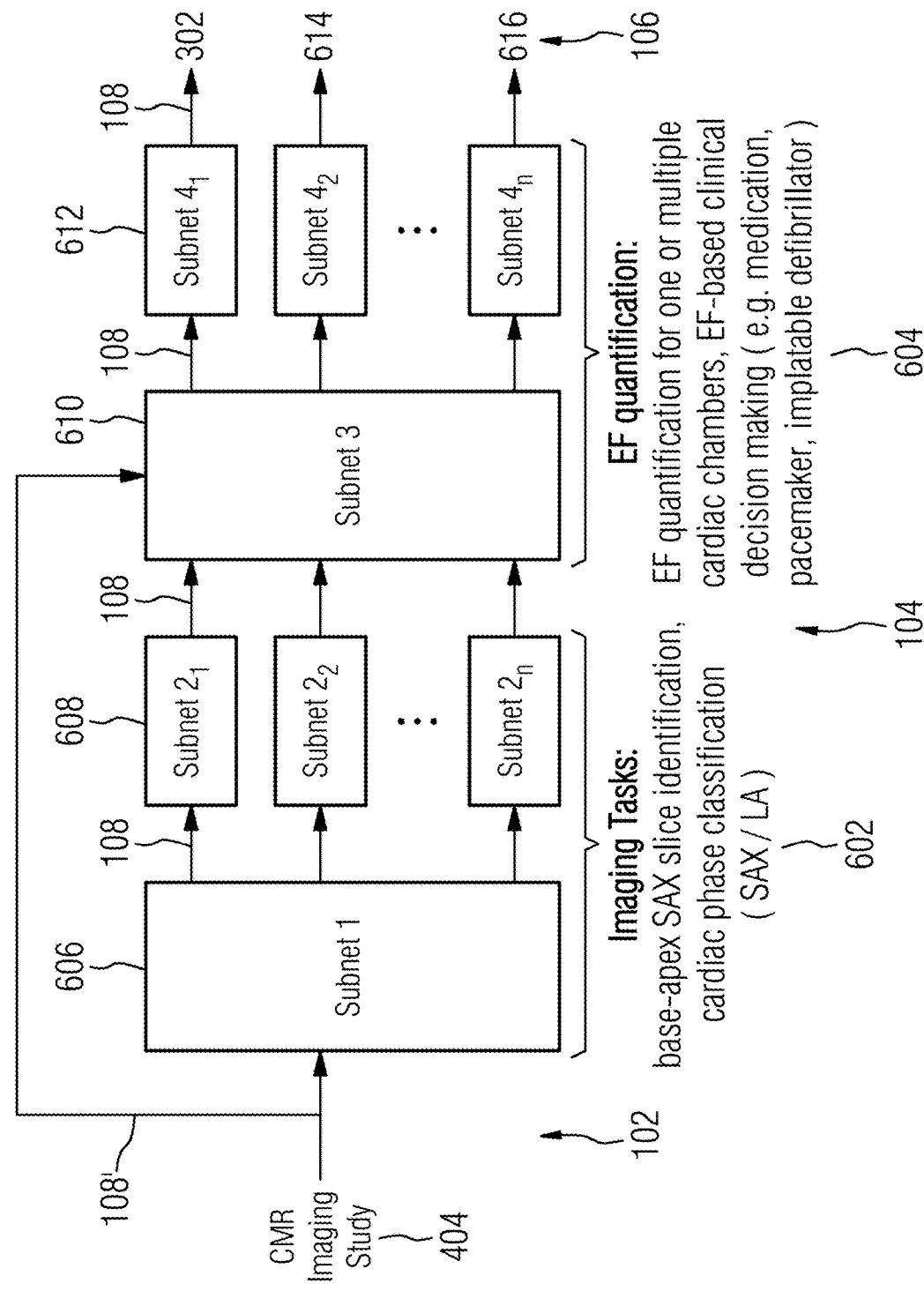
FIG. 6 shows an example network architecture including two layers, wherein a first layer performs imaging tasks and a second layer performs EF quantifications tasks, which first and second layer may be implementable as hidden layers and/or input and output layers, respectively, of the neural network system of FIG. 1.

An example with two layers of sub-networks and/or types of related tasks is displayed in FIG. 6. A first layer 602 (including multiple sub-networks 606 and 608) performs imaging tasks like base-apex SAX slice 404 identification and/or cardiac phase classification (e.g., along SAX and/or LAX) such as identifying ED, ES and/or intermediary frames and/or phases. A second layer 604 (including from multiple sub-networks 610 and 612) performs the EF quantification task (possibly for multiple cardiac chambers including, e.g., LV-EF and RV-EF). Alternatively, or in addition, the second layer 604 may perform clinical decision making and/or recommendation based on the value indicative of the EF 302 (e.g., in view of future medication, implantation of a pacemaker and/or an implantable defibrillator) and/or determine further cardiac metrics indicative of cardiac function at reference signs 614 and 616, respectively.

By forcing the neural network system 100 to learn multiple related tasks, the performance obtained on the main task of interest, e.g., the value indicative of the LV-EF 302, may increase.

Within the multi-task learning framework, to further boost performance, noisy training labels may be exploited by specifically encoding a weak supervision in the form of labeling functions, as described, e.g., by A. Ratner et al. in "Data Programming: Creating Large Training Sets, Quickly", https://arxiv.org/abs/1605.07723.

Labeling functions may have widely varying error rates and/or may conflict on certain data points (e.g., across different slices 404 and/or frames 404). They may be modeled as a generative process, leading to an automated denoising by learning the accuracies of the labeling functions along with their correlation structure. A labeling function need not have perfect accuracy or recall; rather, it represents a pattern that the user wishes to impart to their model and that is easier to encode as a labeling function than as a set of hand-labeled examples. Labeling functions may be based on external knowledge bases, libraries or ontologies, may express heuristic patterns, or some hybrid of these types. The use of labeling functions is also, e.g., strictly, more general than manual annotations, as a manual annotation may, e.g., always, be directly encoded by a labeling function. Alternatively, or in addition, labeling functions can overlap, conflict and even have dependencies which users can provide as part of the data programming specification.

The sub-networks 612 of the disease quantification and/or clinical decision tasks may use as input the outputs of the previous tasks and/or sub-network(s) 610. Alternatively, or in addition, the first layer 602 and the second layer 604 may be cascaded. The subnets 606, 608, 610 and 612 may be consecutively interconnected 108, e.g., the input of subnet 610 may include the output of subnet 608. The cascading may include the input of, e.g., subnet 610 further including input data from and/or at the input layer 102, as exemplified by the interconnection 108' in FIG. 6.

Multiple labeling functions may be defined for the EF quantification 302 task, as exemplified above. Annotations performed in the past by clinicians to quantify the EF 302 may be included as, e.g., training, labels. Alternatively, or in addition, the, e.g., training, labels may include medical reports. A medical report may contain, e.g., visually estimated EF 302 class information. Alternatively, or in addition, the, e.g., training, labels may include annotations performed on other types of medical images of the same patient (e.g., echocardiography as depicted in FIG. 4 at reference sign 414).

Some of the values of the labeling functions are typically not available for all patients. One of the advantages of the above-described approach of using labeling functions is that for each labeling function one can also assign an 'abstain' value.

A fifth embodiment, which is combinable with any other embodiment disclosed herein, is described with reference to FIG. 7.

Since the method 200 does not (e.g., explicitly) rely on segmentations, it may be challenging to achieve high accuracy for very low and/or very high values indicative of the EF 302. Very low and/or very high values indicative of the EF 302 may have a low prevalence in a training database including real data. Especially for low values of the EF 302 (e.g., around and below 30-35%), it is important to be able to accurately quantify the EF 302.

Conditional GAN based approaches may be employed to synthetically generate datasets, e.g., with very high and/or very low values indicative of the EF 302. A desired value indicative of the EF 302 may be included as input to the conditional GAN for synthetically generating a dataset.

A possible approach for generating new data with, e.g., low values indicative of the EF 302 includes generating new sequences from masks 702.

The advantage of this method is that one can generate as many masks 702 as required, and the associated (e.g., desired and/or synthetically generated) value indicative of the EF 302 may be very precise, since (e.g., LV) masks are used to determine the value.

Figure 7:
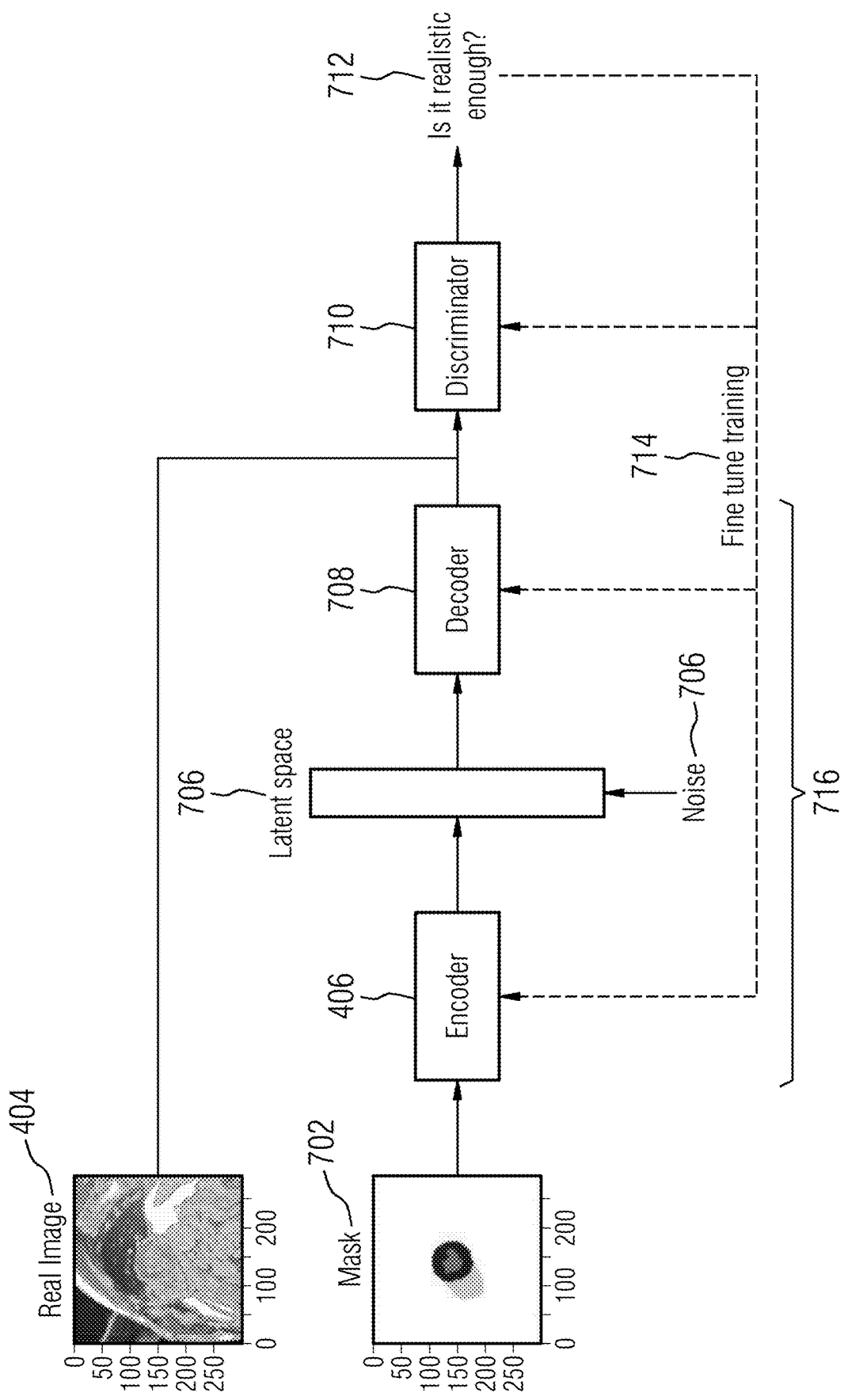
FIG. 7 shows an example network architecture for generating synthetic training data using a generative adversarial network (GAN), which training data may be used for training the neural network system of FIG. 1.

FIG. 7 describes a possible architecture, e.g., of a conditional GAN 716, for the image-to-image (e.g., from real to synthetic CMR images) translation task. An encoder network 406 learns to, e.g., always, determine measures (e.g., a volume, wall thickness and/or contour) of a cardiac chamber (e.g., LV, RV and/or myocardium) according to the mask 702. Alternatively, or in addition, the encoder network 406 may learn to determine other anatomical details and/or anatomical structures (e.g., related to wall and/or valve motion and/or pathology. The encoder network 406 may employ a latent space 704 for the determination task depending on a noise 706. The output of the determination task may be fed into a decoder network 708. A discriminator 710 may receive real CMR images 404 and/or synthetic masks 702, e.g., alternatingly, as input and output at reference sign 712 if the generated mask 702 is realistic enough for training purposes of the neural network system 100. The generation of synthetic masks 702 and/or the training of the networks 406, 708, 710 and/or 712 may be fine-tuned as exemplified at reference sign 714.

Alternatively, or in addition, it is possible to use an adapted cycle GAN 716 architecture in order to convert a sequence of frames 404 and/or slices 404 corresponding to a healthy patient (e.g., with normal value of the EF 302, in ranges from 55% to 70%) to a sequence of frames 404 and/or slices 404 corresponding to a patient with abnormal EF 712 (with, e.g., low value of the EF 712 below and/or in the range of 50 to 55% and/or with, e.g., high value of the EF 712 above 70%).

Figure 8:
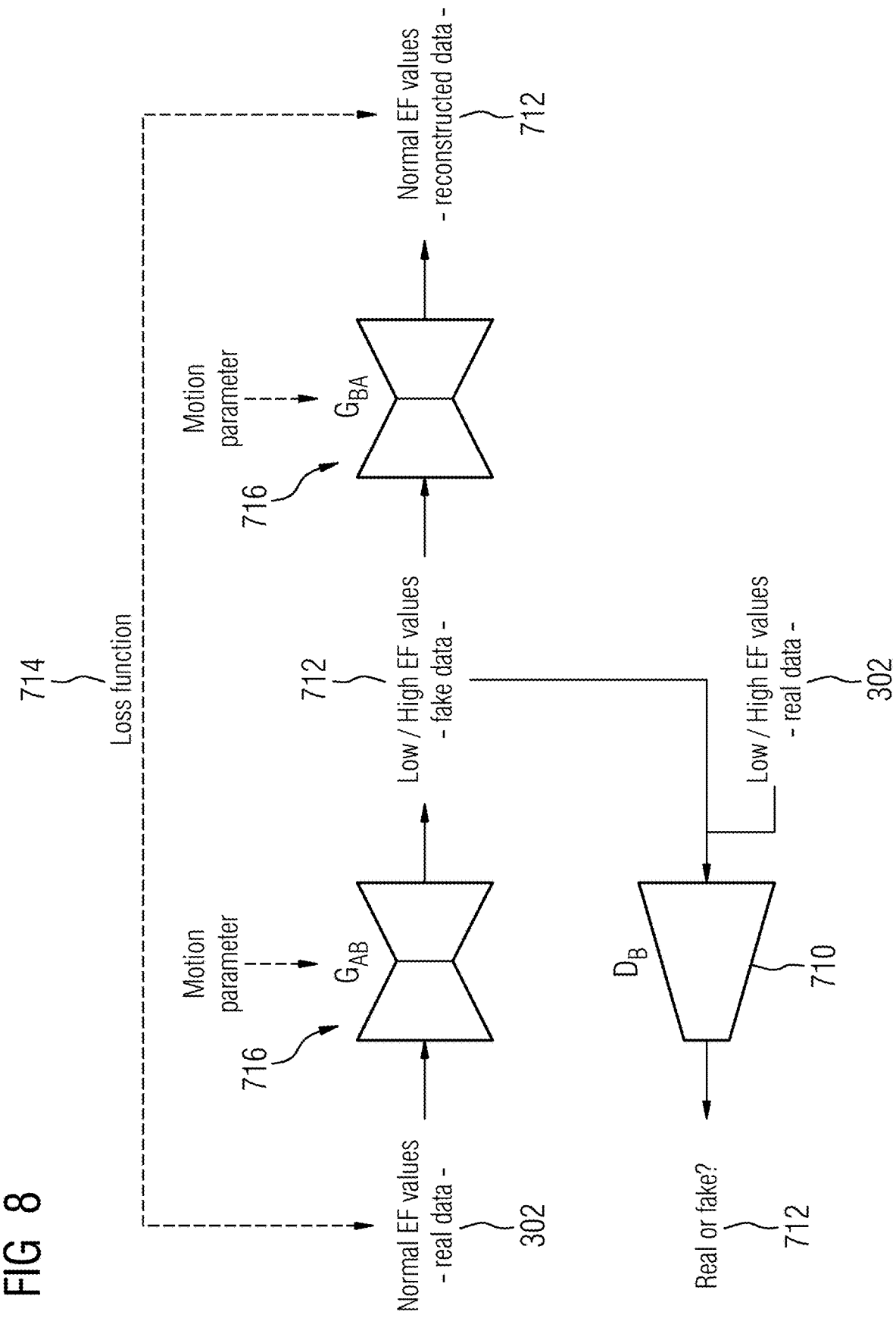
FIG. 8 shows a further example network architecture for generating synthetic training data using an adapted cycle GAN, which training data may be used for training the neural network system of FIG. 1.

The generator network, e.g., GAN 716, may include multiple models, as exemplified in FIG. 8. A motion model may be employed to learn the magnitude of the motion. E.g., deformations of real CMR images may generate synthetic CMR images in dependence of a motion parameter encoding a (e.g., preset) change of the value of the EF 302 from normal at reference sign 302 to abnormally low and/or abnormally high at reference sign 712. Generating synthetic training data by applying deformations (e.g., diffeomorphic transformations) on CMR image sequences is, e.g., described by J. Krebs et al. in "Unsupervised Probabilistic Deformation Modeling for Robust Diffeomorphic Registration", DLMIA 2018, ML-CDS 2018, pp. 101-109, 2018.

The magnitude and/or one or more parameters of the motion model may be modified (e.g., by the first network $G_{AB}$ 716 on the left-hand side of FIG. 8) to represent a lower and/or higher value of the EF 712 (e.g., at the center of FIG. 8), e.g., in a first act. In a second act, e.g., the modified motion model and/or the parameter of the motion model may be employed for generating modified synthetic CMR images (e.g., denoted as "fake data" at reference sign 712 at the center of FIG. 8 or as "reconstructed data" at reference sign 712 on the right-hand-side of FIG. 8) corresponding to the updated value of the EF 712. As a concrete example, the motion model may be applied to the first time frame 404 in a temporal sequence (also: "series") to generate a new cine CMR image series with a reduced cardiac motion, e.g., for one slice 404. The application of the motion model and generation of a new cine CMR image series may be repeated for all slices 404 in the temporal sequence.

In a first implementation, the value of the EF 302 is modified, e.g., explicitly, by an (e.g., predefined) amount to arrive at an abnormal value of the EF 712. In a second implementation, which is combinable with the first implementation, an additional input parameter may be used in the generator 716, to specify how the magnitude of the motion should be modified, and hence, e.g., implicitly, the value of the EF changes from the one at reference sign 302 to the one at reference sign 712. The input parameter (also: "motion parameter") may be fixed during, e.g., initial, training. The input parameter may be modified afterwards, e.g., at a later training stage and/or to create a second synthetic training data set.

In sixth embodiment, which is combinable with any other embodiment disclosed herein, a fully unsupervised learning approach may be employed to cluster data into desired categories of values of the EF 302. To cluster sequences of frames 404 and/or slices 404, features describing the volume of a cardiac chamber (e.g., LV volume and/or RV volume) have to be extracted.

Figure 9:
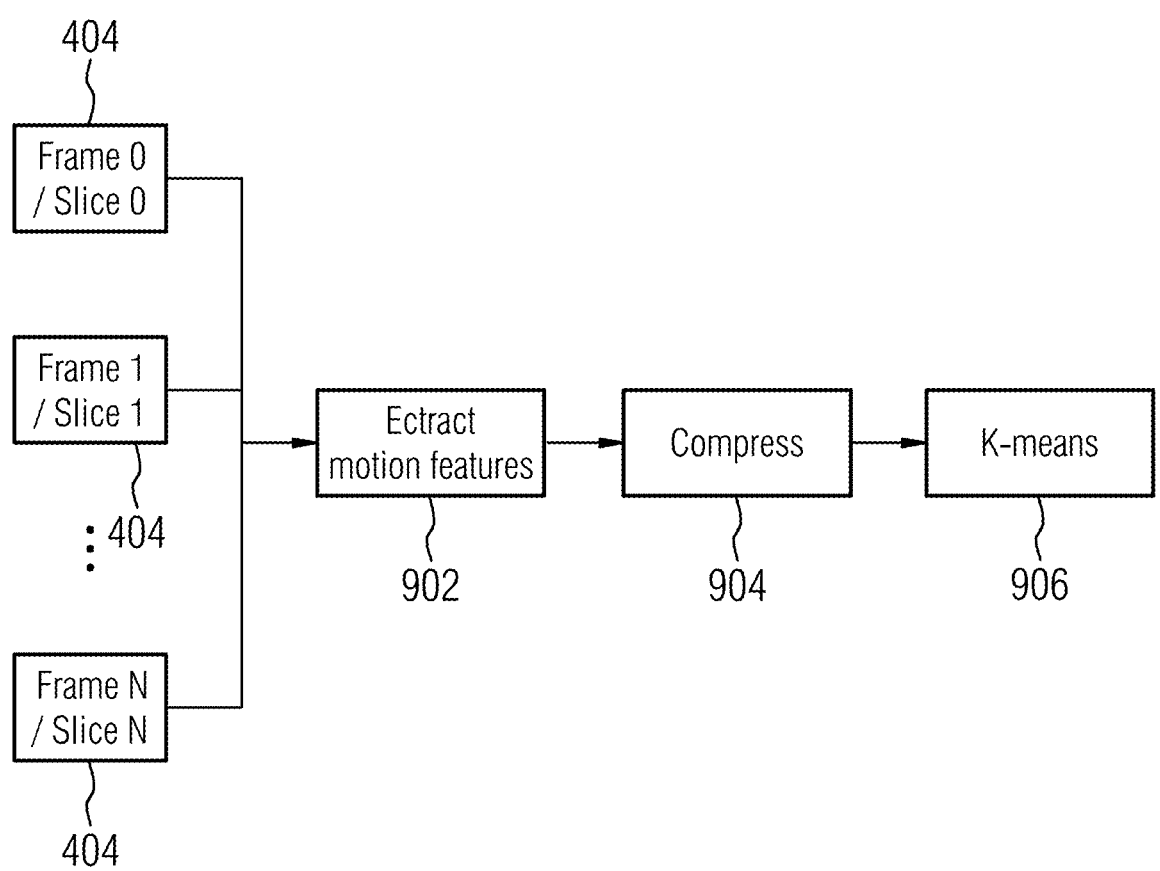
FIG. 9 shows an example flowchart of a method for compressing a temporal sequence of a stack of slices and/or frames of CMR images into a feature vector for outputting a class to which a value indicative of the EF may be associated, which method may be performed by the neural network system of FIG. 1.

The sixth embodiment is described in the context of FIG. 9. In the absence of any label, the features (including, e.g., LV volume) may be determined by analyzing the heart motion at reference sign 902 and, e.g., compressing the input CMR image sequence into a motion heatmap at reference sign 904. This analysis can be done by multiple algorithms like motion history images and/or more complex computer vision pipelines.

In a motion history image, the temporal motion or spatial information of the images 404 is collapsed into a single image template where the intensity is a function of recency of motion in a sequence.

After the sequence of data is compressed at reference sign 904 into a single feature map, another DNN may employed to compress 904 the feature map into a feature vector. The DNN for any of the compression acts 904 may be an encoder (e.g., encoder 406) trained or pre-trained on CMR images. For clustering, a k-means algorithm can be employed, including e.g., three groups: (e.g., abnormally) low, normal and (e.g., abnormally) high values of the EF 302.

By the neural network system, the method and the computer program product as disclosed herein, it is possible to determine a value indicative of a cardiac function (e.g., a value indicative of an EF of any of the four cardiac chambers) fully automatically and/or during an ongoing CMR examination. For example, responsive to an initial value indicative of the cardiac function with associated confidence metric, the ongoing CMR examination protocol may be modified (e.g., by a user). Thereby, the confidence metric and/or a confidence level of the (e.g., iteratively re-determined and/or up-dated) value indicative of the EF may be improved.

The neural network system, device, method and non-transitory computer readable storage medium storing a computer program product disclosed herein may be combined with any CMR and/or MRI product and/or apparatus used for CMR imaging and/or any MRI scanner.

Many advantages of the present embodiment will be fully understood from the foregoing description, and it will be apparent that various changes may be made in the form, construction and arrangement of (e.g., the layers and/or sub-networks of) the neural network system and the associated method without departing from the scope of the embodiment and/or without sacrificing all of its advantages. Since the embodiment can be varied in many ways, it will be recognized that the embodiment should be limited only by the scope of the following claims.

The invention claimed is:

1. A system for outputting a value indicative of an ejection fraction (EF), of a cardiac chamber of a heart based on a first temporal sequence of cardiac magnetic resonance (CMR) images of the cardiac chamber, the system comprising:
   a computer configured as a neural network, the neural network comprising:
   an input layer configured to receive the first temporal sequence of a first stack of slices of the CMR images along an axis of the heart, the first temporal sequence comprising one or multiple consecutive cardiac cycles of the heart; and
   an output layer configured to output the value indicative of the EF of the cardiac chamber based on the first temporal sequence of the first stack of slices of the CMR images along the axis of the heart,
   wherein the neural network has interconnections between the input layer and the output layer and was trained by a plurality of datasets, each of the datasets comprising an instance second temporal sequence of a second stack of slices of CMR images along the axis over one or multiple consecutive cardiac cycles for the input layer and an associated instance value indicative of the EF for the output layer.

2. The system of claim 1, wherein the axis of the heart comprises at least one of:
   a short-axis, SAX; and
   a long-axis, LAX, the first slices along LAX intersecting with two, three or four cardiac chambers of the heart including the cardiac chamber for which the value indicative of the EF is output.

3. The system of claim 1, wherein the input layer is further configured to receive data representative of cardiac images acquired from imaging procedures other than CMR.

4. The system of claim 1, wherein the interconnections or the output layer are further configured to at least one of:
   (a) determine a numerical value indicative of the EF; and
   (b) classify the EF according to a finite set of classes.

5. The system of claim 1, wherein the plurality of datasets used to train each comprised at least one of:
   (a) the second temporal sequence of the second stack of slices of the CMR images being along a short axis, SAX;
   (b) the second temporal sequence of the second stack of slices of the CMR images being along a long-axis, LAX, the slices of the second stack intersecting with 2, 3 or 4 cardiac chambers of the heart including the cardiac chamber for which the value indicative of the EF is to be output;
   (c) at least one cardiac image acquired from imaging procedures other than CMR; and
   (d) data representative of a prior medical examination.

6. The system of claim 1, wherein the computer is configured to iteratively determine the value indicative of the EF as the first temporal sequence of the first stack of slices of the CMR images becomes available.

7. The system of claim 1, wherein the output layer is further configured to output a confidence metric of the value indicative of the EF.

8. The system of claim 1, wherein the input layer is further configured to selectively receive a further temporal sequence of a further stack of slices of the CMR images depending on the output value indicative of the EF based on the first temporal sequence of the first stack of slices of the CMR images being along the axis.

9. The system of claim 1, wherein the first stack of slices of CMR images comprises at least an end-diastolic (ED) frame and at least an end-systolic (ES) frame.

10. The system of claim 1, wherein the neural network further comprising at least one of:
    a first sub-network configured to identify spatial positions of the slices of the first temporal sequence of the first stack of slices of the CMR images along the axis, the spatial positions comprising at least one of an apical region, a basal region and an intermediate region of the cardiac chamber; and
    a second sub-network configured to identify temporal instances of the first stack of slices of the CMR images along the axis, the temporal instances comprising at least end diastolic (ED) and end systolic (ES).

11. The system of claim 1, wherein the neural network further comprises at least one of:

a first sub-network comprising a feature extractor network, wherein the feature extractor network is configured to output features of the first temporal sequence of the first stack of slices of the CMR images along the axis received from the input layer;
a second sub-network comprising a squeeze and excitation (SE) network, which is configured to receive the output of the first sub-network as input, wherein the SE network is configured to model interdependencies between features from at least two different slices and/or frames output by the feature extractor network; and
a third sub-network comprising a classifier network, which is configured to classify the features encoded by the feature extractor network.

12. The system of claim 11 wherein the feature extractor network comprises an encoder sub-network and a recurrent sub-network, the feature extractor network comprises a convolutional neural network, and the classifier network comprises a recurrent neural network.

13. The system of claim 1, wherein the neural network was trained with an unsupervised training, the unsupervised training having comprised:
a temporally order of at least two frames of the CMR images along the axis, wherein the at least two frames of the CMR images were temporally random in advance; and
a spatially order of at least two slices of the CMR images of the second stack along the axis, wherein the at least two slices of the CMR images of the second stack were random in advance.

14. The system of claim 1, wherein the output of the neural network comprises at least one of:
one or more further cardiac metrics in addition to the value indicative of the EF, the one or more further cardiac metrics being based on the received input to the input layer; and
a future treatment option based on the value indicative of the EF.

15. The system of claim 14, wherein a different labeling function is assigned to each of the at least two different cardiac metrics, wherein a domain of each of the labeling functions comprises an abstain value, the abstain value being assigned upon occurrence of:
(a) no input data are available for the labeling function; or
(b) the output does not comprise a decisive value.

16. The system of claim 1, wherein the datasets used in training comprised a plurality of synthetic datasets, each of the synthetic datasets comprising an instance temporal sequence of the second stack of slices of the CMR images along the axis over one or multiple consecutive cardiac cycles for the input layer and an associated instance value indicative of the EF for the output layer.

17. The system of claim 16, wherein the synthetic datasets from at least one of an encoder network and a generative adversarial network.

18. The system of claim 1, wherein the output of the neural network is based on a motion heatmap and/or a motion history image.

19. The system of claim 1 wherein the computer comprises a computer of a magnetic resonance imaging device configured to acquire the CMR images of the first sequence.

20. A method for outputting a value indicative of an ejection fraction (EF) of a cardiac chamber of a heart based on a temporal sequence of cardiac magnetic resonance (CMR) images of the cardiac chamber using a neural network system, the method comprising:
receiving, at an input layer of the neural network system, the temporal sequence of a stack of slices of the CMR images along an axis of the heart, the temporal sequence comprising one or multiple consecutive cardiac cycles of the heart; and
outputting, at an output layer of the neural network system, the value indicative of the EF of the cardiac chamber based on the temporal sequence of the stack of slices of the CMR images along the axis of the heart,
wherein the neural network system has interconnections between the input layer and the output layer; and
wherein the neural network system was trained with a plurality of datasets, each of the datasets comprising an instance temporal sequence of a stack of slices of CMR images along the axis over one or multiple consecutive cardiac cycles for the input layer and an associated instance value indicative of the EF for the output layer.

21. A non-transitory computer readable storage medium having stored thereon program code executable by a computer for outputting a value indicative of an ejection fraction (EF) of a cardiac chamber of a heart based on a temporal sequence of cardiac magnetic resonance (CMR) images of the cardiac chamber using a neural network system, the storage medium comprising the computer code for:
receiving, at an input layer of the neural network system, the temporal sequence of a stack of slices of the CMR images along an axis of the heart, the temporal sequence comprising one or multiple consecutive cardiac cycles of the heart; and
outputting, at an output layer of the neural network system, the value indicative of the EF of the cardiac chamber based on the temporal sequence of the stack of slices of the CMR images along the axis of the heart,
wherein the neural network system has interconnections between the input layer and the output layer; and
wherein the neural network system was trained with a plurality of datasets, each of the datasets comprising an instance temporal sequence of a stack of slices of CMR images along the axis over one or multiple consecutive cardiac cycles for the input layer and an associated instance value indicative of the EF for the output layer.

* * * * *